(12) United States Patent
Kin

(10) Patent No.: US 11,572,714 B2
(45) Date of Patent: Feb. 7, 2023

(54) HANDLE DEVICE FOR VEHICLE

(71) Applicant: ALPHA CORPORATION, Kanagawa (JP)

(72) Inventor: Lan Kin, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 241 days.

(21) Appl. No.: 16/685,590

(22) Filed: Nov. 15, 2019

(65) Prior Publication Data

US 2020/0080347 A1    Mar. 12, 2020

Related U.S. Application Data

(63) Continuation of application No. PCT/JP2018/019207, filed on May 17, 2018.

(30) Foreign Application Priority Data

May 19, 2017   (JP) .............................. JP2017-099501

(51) Int. Cl.
*E05B 79/20* (2014.01)
*E05B 7/00* (2006.01)
(Continued)

(52) U.S. Cl.
CPC ............ *E05B 79/20* (2013.01); *E05B 1/0053* (2013.01); *E05B 7/00* (2013.01); *E05B 85/12* (2013.01); *B60J 5/04* (2013.01)

(58) Field of Classification Search
CPC .......... E05B 79/10; E05B 79/12; E05B 79/18; E05B 79/20; E05B 79/22; E05B 79/06;
(Continued)

(56) References Cited

U.S. PATENT DOCUMENTS 4,564,163 A  *  1/1986  Barnett .................... F16L 3/12
                                                    248/74.3
4,669,156 A  *  6/1987  Guido ................. F16L 3/2235
                                                    248/74.3
(Continued)

FOREIGN PATENT DOCUMENTS

CN          103097629 A      5/2013
CN          103774936 A      5/2014
(Continued)

OTHER PUBLICATIONS

Written Opinion issued in PCT/JP2018/019207; dated Jun. 19, 2018.
(Continued)

*Primary Examiner* — Alyson M Merlino
(74) *Attorney, Agent, or Firm* — Studebaker & Brackett PC

(57) ABSTRACT

A handle device for vehicle configured to operate a door lock device via a cable device, the handle device includes an operation member connected to the cable device; and a handle case housing the operation member. The handle case includes a cable fixing base in which the cable device is arranged, a cap part configured to fix the cable device to the cable fixing base, and a hinge portion provided between the cable fixing base and the cap part, and rotating the cap part from an open position at which the cap part is open with respect to the cable fixing base to a fixing position at which the cap part faces the cable fixing base and clamps the cable device between the cap part and the cable fixing base.

11 Claims, 5 Drawing Sheets

(51) Int. Cl.
*E05B 85/12* (2014.01)
*E05B 1/00* (2006.01)
*B60J 5/04* (2006.01)

(58) Field of Classification Search
CPC . E05B 7/00; E05B 85/10; E05B 85/12; E05B 85/13; E05B 85/14; E05B 85/16; E05B 85/18; E05B 1/0053; A47B 2097/003; F16L 3/00; F16L 3/08; F16L 3/237; A61M 5/1418; Y10T 292/57; Y10S 292/30; Y10S 292/38; Y10S 292/53; Y10S 292/54; Y10S 292/64
See application file for complete search history.

(56) References Cited

U.S. PATENT DOCUMENTS

| | | | | |
|---|---|---|---|---|
| 5,494,245 | A * | 2/1996 | Suzuki | F16L 3/1075 248/68.1 |
| 5,613,655 | A * | 3/1997 | Marion | F16L 3/2235 248/68.1 |
| 5,653,411 | A | 8/1997 | Picco et al. | |
| 6,565,049 | B2 * | 5/2003 | Hahn | B60R 16/0215 248/74.1 |
| 7,041,903 | B2 * | 5/2006 | Odahara | F16L 3/1025 248/68.1 |
| 7,201,352 | B2 * | 4/2007 | Kawai | F16L 3/1075 248/74.1 |
| 7,387,282 | B2 * | 6/2008 | Kovac | F16L 3/237 248/55 |
| 7,661,631 | B2 * | 2/2010 | Ibaraki | F16L 3/1075 248/73 |
| 7,712,708 | B2 * | 5/2010 | Clark | F16L 3/1075 248/74.1 |
| 8,157,223 | B2 * | 4/2012 | Stau | F16L 3/237 248/74.2 |
| 8,727,401 | B2 * | 5/2014 | Tanaka | E05B 85/12 292/336.3 |
| 8,864,193 | B2 * | 10/2014 | Mori | E05B 79/20 292/336.3 |
| 9,022,438 | B2 * | 5/2015 | Mori | E05B 79/20 292/336.3 |
| 2005/0115730 | A1 | 6/2005 | Odahara et al. | |
| 2013/0038074 | A1 | 2/2013 | Mori et al. | |
| 2013/0168979 | A1 | 7/2013 | Minemura | |
| 2014/0076094 | A1 | 3/2014 | Mori et al. | |
| 2014/0117682 | A1 | 5/2014 | Konchan et al. | |
| 2016/0001643 | A1 | 1/2016 | Ichikawa | |
| 2018/0029452 | A1 * | 2/2018 | Shibayama | E05B 79/20 |
| 2020/0080352 | A1 * | 3/2020 | Kin | E05B 79/20 |
| 2021/0087860 | A1 * | 3/2021 | Kin | E05B 85/12 |

FOREIGN PATENT DOCUMENTS

| | | | |
|---|---|---|---|
| CN | 105074107 A | 11/2015 | |
| DE | 35 39 678 A1 | 5/1986 | |
| DE | 19810834 A1 * | 9/1998 | F16L 3/237 |
| EP | 0 671 580 A1 | 9/1995 | |
| JP | S54159924 A | 12/1979 | |
| JP | H08035465 A | 2/1996 | |
| JP | 2008-184881 A | 8/2008 | |
| JP | 2012-097476 A | 5/2012 | |

OTHER PUBLICATIONS

The extended European search report issued by the European Patent Office dated Feb. 2, 2021, which corresponds to European Patent Application No. 18803071.2-1005 and is related to U.S. Appl. No. 16/685,590.

An Office Action mailed by China National Intellectual Property Administration dated Sep. 1, 2020, which corresponds to Chinese Patent Application No. 201880033077.5 and is related to U.S. Appl. No. 16/685,590 with English language translation.

International Search Report issued in PCT/JP2018/019207; dated Jun. 19, 2018.

* cited by examiner

HANDLE DEVICE FOR VEHICLE

CROSS REFERENCE TO RELATED APPLICATIONS

This application is a continuation of PCT application No. PCT/JP18/019207, which was filed on May 17, 2018 based on Japanese Patent Application No. 2017-099501 filed on May 19, 2017, the contents of which are incorporated herein by reference.

TECHNICAL FIELD

The present invention relates to a handle device for vehicle.

BACKGROUND ART

In the related art, a handle device for performing an opening operation of a door of a vehicle is known. The handle device is provided, for example, on a side door. The side door is provided with a door lock device that is engaged with a vehicle body and holds the side door in a closed state, and the door lock device and the handle device are connected via a cable device. The cable device includes an inner cable and a hollow outer cable, and the inner cable is inserted into the outer cable. When the handle device is operated, an operating force of an operator is applied through the inner cable of the cable device, and the door lock device is operated accordingly.

In addition to a handle operated by the operator, the handle device includes a handle case that houses the handle. The handle case includes a cable fixing base on which an outer cable of the cable device is arranged, a cap part that fixes the outer cable to the cable fixing base, and a thin plate shaped hinge portion that rotates the cap part with respect to the cable fixing base. The handle case is manufactured as an integrally molded product that is obtained by linearly connecting the cable fixing base with the cap part with the hinge portion therebetween, and is shipped to a vehicle manufacturing process as a part of the components constituting the handle device.

In the vehicle manufacturing process, the outer cable of the cable device is fixed to the cable fixing base. Specifically, first, an end portion of the outer cable is arranged on the cable fixing base. Next, the cap part is rotated around the hinge portion, and the cap part is opposed to the cable fixing base. Accordingly, the outer cable is clamped between the cap part and the cable fixing base, and is fixed to the cable fixing base.

For example, Patent Literature 1 discloses a structure in which an end portion of an outer cable is held by a clip attached to a handle base.

CITATION LIST

Patent Literature

[Patent Literature 1] JP-A-2012-097476

When a cap part is rotated, a force in directions other than a rotation direction may be input to the cap part. In order to obtain rotation performance of the cap part, since a hinge portion has an appropriate flexibility, a rotational position deviation of the cap part may occur due to the force in directions other than the rotation direction. This deviation causes distortion in the hinge portion, causes cracking, and causes an assembly position deviation with respect to a cable fixing base.

SUMMARY OF INVENTION

According to an embodiment of the present invention, in a handle device for vehicle, it is possible to suppress occurrence of a positional deviation when a cap part is rotated.

According to the embodiment of the present invention, a handle device for vehicle configured to operate a door lock device via a cable device, the handle device for vehicle includes an operation member connected to the cable device; and a handle case housing the operation member. The handle case includes a cable fixing base in which the cable device is arranged, a cap part configured to fix the cable device to the cable fixing base, and a hinge portion provided between the cable fixing base and the cap part, and rotating the cap part from an open position at which the cap part is open with respect to the cable fixing base to a fixing position at which the cap part faces the cable fixing base and clamps the cable device between the cap part and the cable fixing base. The cap part includes a movable guide piece erected on the cap part. The cable fixing base includes a fixed guide piece erected on the cable fixing base. The fixed guide piece is erected in front of the movable guide piece with the hinge portion therebetween when the cap part is positioned at the open position, and restricts a movable range of the movable guide piece, thereby guiding a rotational position of the cap part from the open position to the fixing position.

According to the embodiment of the present invention, the hinge portion may be configured by a leaf spring.

According to the embodiment of the present invention, the fixed guide piece and the movable guide piece are disposed at positions adjacent to each other with the hinge portion therebetween, when the cap part is positioned at the open position.

According to the embodiment of the present invention, the cable fixing base may include a claw portion engaging with a claw receiving portion provided on the cap part and fixing the cap part at the fixing position. The claw portion may be a fixed guide piece.

Advantageous Effects of Invention

According to the embodiment of the present invention, it is possible to suppress occurrence of the positional deviation when the cap part is rotated.

DESCRIPTION OF EMBODIMENTS

Figure 1:
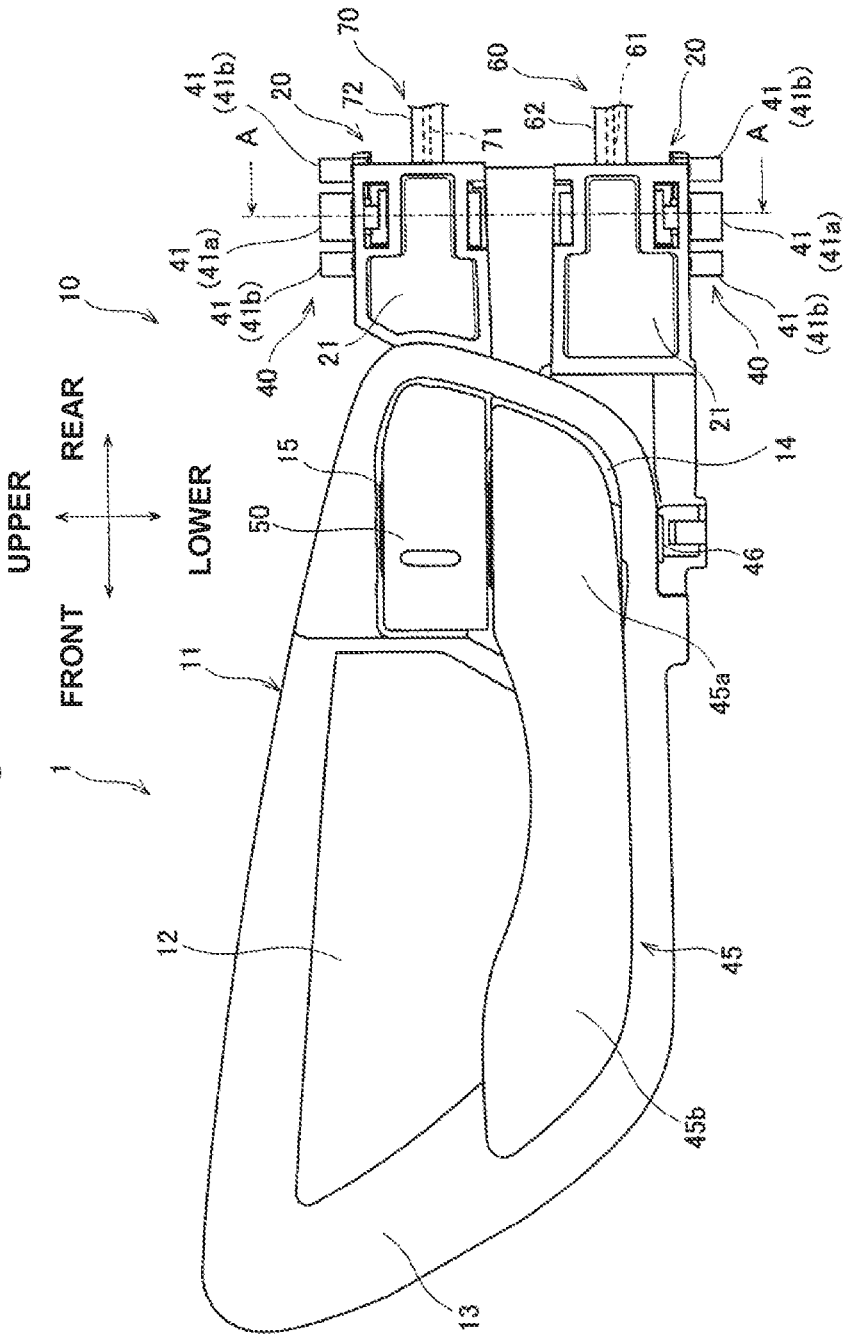
FIG. 1 is a front view schematically showing an inside door handle device.
Figure 2:
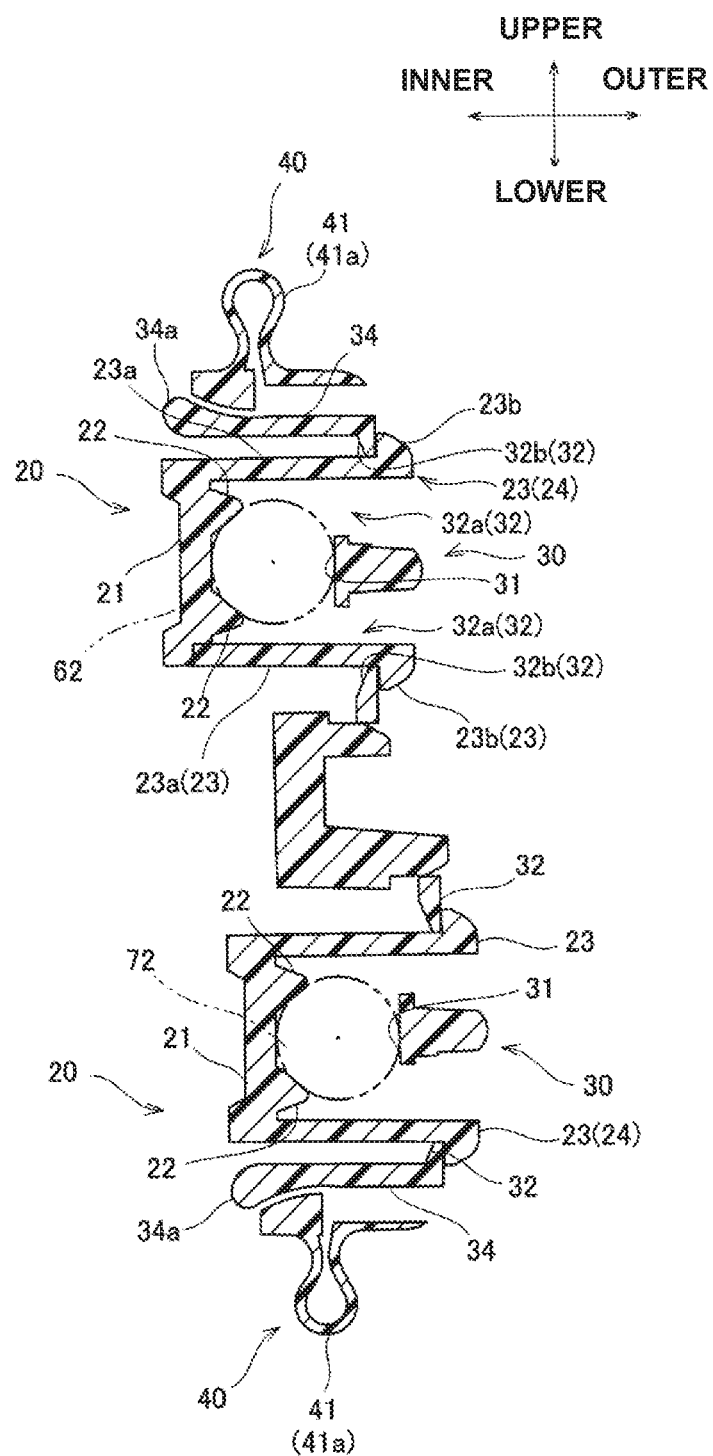
FIG. 2 is a cross-sectional view of the inside door handle device shown in FIG. 1 taken along a line A-A.

Hereinafter, an inside door handle device 1 according to the present embodiment will be described as being applied to a side door of a vehicle. Here, FIG. 1 is a front view schematically showing the inside door handle device 1 according to the present embodiment. FIG. 2 is a cross-sectional view of the inside door handle device 1 shown in FIG. 1 taken along a line A-A.

The inside door handle device 1 is a handle device for vehicle for performing an opening operation of a side door of the vehicle from a vehicle interior side. The inside door handle device 1 is disposed in a door trim, that is an interior member, that covers the inside (vehicle interior side) of the side door, and is fixed to a required position of a door inner panel that constitutes the side door. The side door is provided with a door lock device (not shown) that includes a latch portion that is engaged with a vehicle body and holds the side door in a closed state, and cable devices 60, 70 that connect the door lock device with the inside door handle device 1.

The inside door handle device 1 mainly includes a handle case 10, a handle 45, and a lock knob 50.

The handle case 10 is disposed in an opening provided in the door trim and faces the vehicle interior side so as to be formed integrally with the door trim.

The handle case 10 includes a case body 11 and a cable holding portion 20.

The case body 11 is a member that houses the handle 45 and the lock knob 50 and forms a space required for gripping the handle 45. The case body 11 includes a plate-shaped vertical wall portion 12 and a peripheral wall portion 13 connected to a peripheral edge of the vertical wall portion 12. A cross section of the case body 11 along an upper-lower direction is formed in a substantially U shape having the vertical wall portion 12 as a bottom portion.

A handle holding portion 14 holding the handle 45 and a lock knob holding portion 15 holding the lock knob 50 are formed on a vehicle rear side of the vertical wall portion 12.

The handle holding portion 14 is set at a lower position in the case body 11, and the lock knob holding portion 15 is set at an upper position of the handle holding portion 14 in the handle case 10. In the case body 11, the handle 45 and the lock knob 50 are disposed in the upper-lower direction.

The peripheral wall portion 13 has a flange shape extending toward the vehicle interior side from a connecting portion with the vertical wall portion 12 as a base point. The shape of a tip end side of the peripheral wall portion 13 is set along a peripheral shape of the opening of the door trim, and is designed to be integrated with the door trim.

The cable holding portion 20 is disposed on a vehicle rear side of the case body 11. The cable holding portion 20 has a function of fixing a cable device (hereinafter, referred to as "first cable device" as necessary) 60 connected to the handle 45, and a cable device (hereinafter, referred to as "second cable device" as necessary) 70 connected to the lock knob 50. In a state in which the handle case 10 is disposed on the door trim, the cable holding portion 20 is located on a back side of the door trim and is hidden by the door trim. A structure of the cable holding portion 20 will be described in detail below.

The handle 45 is an operation member that is operated by an operator to open the side door. The handle 45 is disposed in a lower part in the handle case 10. The handle 45 includes a base portion 45a housed in the handle holding portion 14, and an operation portion 45b extending forward of the vehicle from the base portion 45a and held by the operator. A pin 46 penetrating the base portion 45a is disposed in the handle holding portion 14 along the upper-lower direction. The handle 45 is pivotally supported by a pin 46 in a rotatable manner. The handle 45 rotates in a range between a closed position at which the handle 45 is housed in the case body 11 and an open position at which the handle 45 is rotated to a predetermined position in the vehicle interior side.

The first cable device 60 is a connecting member that connects the handle 45 with the door lock device, in which one end portion thereof is connected to the handle 45, and another end portion thereof is connected to the door lock device. The first cable device 60 includes an inner cable 61 and a tubular outer cable 62. The inner cable 61 is inserted into a hollow of the outer cable 62 and can move inside thereof.

One end portion of the outer cable 62 is fixed to the cable holding portion 20 of the handle case 10, and another end portion thereof is fixed to the door lock device. That is, the outer cable 62 is held in a fixed state between the inside door handle device 1 and the door lock device. One end portion of the inner cable 61 is connected to the base portion 45a of the handle 45, and another end portion thereof is connected to a movable point that operates the latch portion of the door lock device.

When the handle 45 is in the closed position, the base portion 45a of the handle 45 is housed in the handle holding portion 14. In this case, the latch portion of the door lock device is engaged with the vehicle body, and the side door is maintained in the closed state. On the other hand, when the handle 45 is rotated from the closed position to the open position, the inner cable 61 connected to the base portion 45a is pulled. Accordingly, the movable point of the door lock device connected to the other end of the inner cable 61 is operated, and the engagement state between the latch portion and the vehicle body is released. In this way, when the operator operates the handle 45 to input an operating force to the first cable device 60, the door lock device is operated to open the side door.

The lock knob 50 is an operation member that is operated by the operator to restrict opening of the side door. The lock knob 50 is disposed in an upper part in the handle case 10. A first boss portion protruding downward is provided on an upper end side of the lock knob holding portion 15. A second boss portion protruding upward is provided on a lower end side of the lock knob holding portion 15 at a position facing the first boss portion. The lock knob 50 is rotatably supported by the first boss portion and the second boss portion. The lock knob 50 rotates in a range between a closed position at which the lock knob 50 is housed in the case body 11 and an open position at which the lock knob 50 is rotated to a predetermined position on the vehicle interior side.

The second cable device 70 is a connecting member that connects the lock knob 50 with the door lock device, in which one end portion thereof is connected to the lock knob 50, and another end portion thereof is connected to the door lock device. The second cable device 70 includes an inner cable 71 and a tubular outer cable 72. The inner cable 71 is inserted into a hollow of the outer cable 72 and can move inside thereof.

One end portion of the outer cable 72 is fixed to the cable holding portion 20 of the handle case 10, and another end portion thereof is fixed to the door lock device. That is, the outer cable 72 is held in a fixed state between the inside door handle device 1 and the door lock device. One end portion of the inner cable 71 is connected to the lock knob 50, and another end portion thereof is connected to the door lock device.

When the lock knob 50 is in the closed position, the lock knob 50 is housed in the handle holding portion 14. In this case, the door lock device comes into an unlocked state in which an input of the operating force applied to the movable point by the first cable device 60 is enabled. Therefore, it is possible to freely open the side door by the operation of the handle 45. On the other hand, when the lock knob 50 is rotated from the closed position to the open position, the inner cable 71 connected to the lock knob 50 is pulled. Accordingly, the door lock device connected to the other end portion of the inner cable 71 is operated, and comes into a locked state in which the input of the operating force applied to the movable point by the first cable device 60 is disabled. In the locked state, since the operation of the door lock device by the handle 45 is canceled, the opening of the side door is restricted. In this way, by the operator operating the lock knob 50 and inputting the operating force to the second cable device 70, the door lock device is operated and the opening operation of the side door can be restricted.

Hereinafter, a fixing structure of the cable devices 60, 70 included in the handle case 10, which is one of the features of the present embodiment, will be described. The cable device 60, 70 are fixed to the handle case 10 by the cable holding portion 20. The cable holding portions 20 fix the outer cables 62, 72 of the cable devices 60, 70, and are provided corresponding to the two pairs of cable devices 60, 70, respectively.

The cable holding portion 20 includes a cable fixing base 21 and a cap part 30. The cable fixing base 21 and the cap part 30 face each other with a predetermined interval therebetween. Each of the outer cables 62, 72 is clamped between the cable fixing base 21 located at a vehicle inner side and the cap part 30 located at a vehicle outer side, and is thereby fixed.

The cable fixing base 21 has a substantially flat plate shape. In order to reduce the weight of the cable fixing base 21, a thinned region and a lightening region are set at appropriate positions.

A pair of protrusions 22 protruding toward the cap part 30 is provided on the cable fixing base 21 along the outer cables 62, 72. The pair of protrusions 22 are disposed in parallel at predetermined intervals and located on both sides of the outer cables 62, 72 with the outer cables 62, 72 being arranged on the cable fixing base 21. The pair of protrusions 22 has a function of locating the outer cables 62, 72 and preventing positional deviation of the outer cables 62, 72.

Further, the cable fixing base 21 is provided with a claw portion 23 for fixing the cap part 30. The claw portion 23 includes a pillar portion 23a standing from the cable fixing base 21 to the cap part 30 side, and an engaging claw 23b located at a tip end of the pillar portion 23a. The claw portion 23 is engaged with claw receiving portions 32 provided in the cap part 30 to fix the cap part 30 in a state in which each of the outer cables 62, 72 is clamped. In this embodiment, two sets of claw parts 23 are prepared and are disposed facing each other with a predetermined interval so as to clamp the pair of protrusions 22 therebetween.

The cap part 30 is a member that fixes each of the outer cable 62, 72 to the cable fixing base 21. The cap part 30 has a substantially flat plate shape. The cap part 30 is provided with a clamping portion 31 that clamps each of the outer cables 62, 72 with the cable fixing base 21. When each of the outer cables 62, 72 is clamped between the clamping portion 31 and the cable fixing base 21, the clamping portion 31 abuts against the outer surface of each of the outer cables 62, 72.

Further, in the cap part 30, the claw receiving portions 32 for engaging with the claw portion 23 are provided on both sides of the clamping portion 31. The claw receiving portion 32 includes an opening 32a through which the engaging claw 23b on a tip end side of the claw portion 23 is inserted, and an engaging portion 32b engaged with the engaging claw 23b which has passed through the opening 32a.

The cable holding portion 20 further includes a hinge portion 40 that rotatably connects the cap part 30 to the cable fixing base 21. By the hinge portion 40, the cap part 30 can be rotated between a fixing position at which the cap part 30 faces the cable fixing base 21 and each of the outer cables 62, 72 is clamped between the cable fixing base 21 and the cap part 30 and an open position at which the cap part 30 is open at a constant opening angle with respect to the cable fixing base 21. In the present embodiment, the open position is set to an opening angle (for example, about 180°) in which the cable fixing base 21 and the cap part 30 form a straight line shape via the hinge portion 40.

The hinge portion 40 is provided between the cable fixing base 21 and the cap part 30. The hinge portion 40 is formed of a thin plate-shaped member, and in the present embodiment, is formed as a wave plate and is configured as a leaf spring 41 having a predetermined elasticity. The hinge portion 40 includes a first leaf spring 41a and a pair of second leaf springs 41b disposed on both sides of the first leaf spring 41a. By disposing the second leaf springs 41b on both sides of the first leaf spring 41a, a structure in which a decrease in rigidity of the hinge portion 40 due to a leaf spring structure is suppressed is realized.

Further, in the present embodiment, the cable holding portion 20 is mounted with a structure that suppresses the positional deviation generated when the cap part 30 is rotated. This structure includes a columnar movable guide piece 34 erected on the cap part 30 and a columnar fixed guide piece 24 erected on the cable fixing base 21. The fixed guide piece 24 and the movable guide piece 34 are disposed at positions adjacent to each other with the hinge portion 40 therebetween.

The fixed guide piece 24 is erected on a front surface of the movable guide piece 34 with the hinge portion 40 therebetween, when the cap part 30 is positioned at the open position. The fixed guide piece 24 has a function of guiding the rotational position of the cap part 30 from the open position to the fixing position by limiting a movable range of the movable guide piece 34 (in particular, a protruding end 34a) that rotates together with the cap part 30 during rotation of the cap part 30. However, the fixed guide piece 24 according to the present embodiment is not formed of an independent member, and is substituted by the claw portion 23 close to the hinge portion 40 among the pair of claw portions 23 described above.

Figure 3:
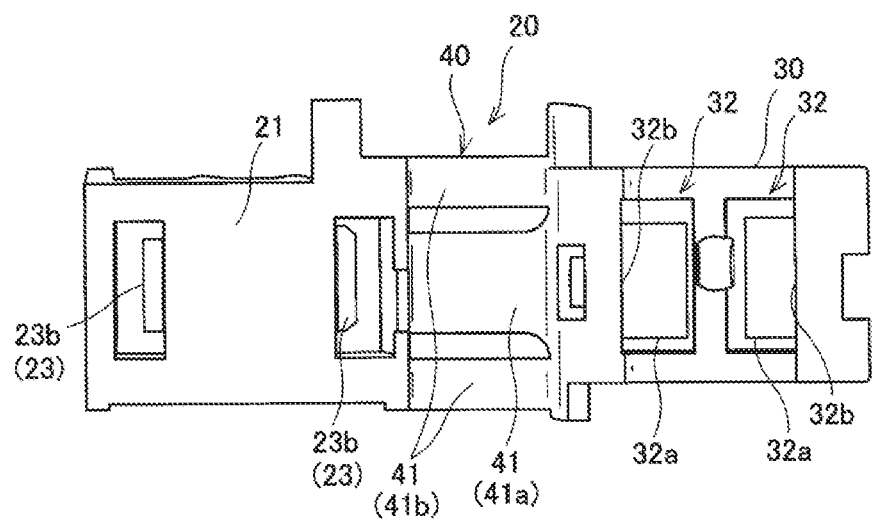
FIG. 3 is a front view of a cable holding portion manufactured as an integrally molded product.
Figure 4:
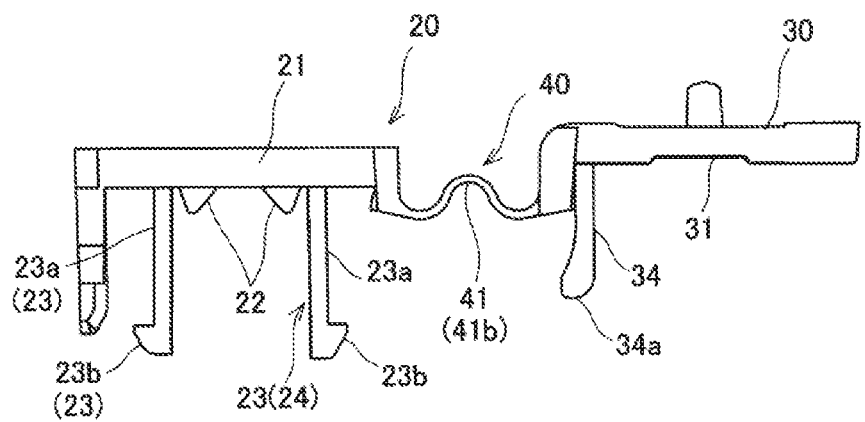
FIG. 4 is a side view of the cable holding portion shown in FIG. 3.
Figure 5:
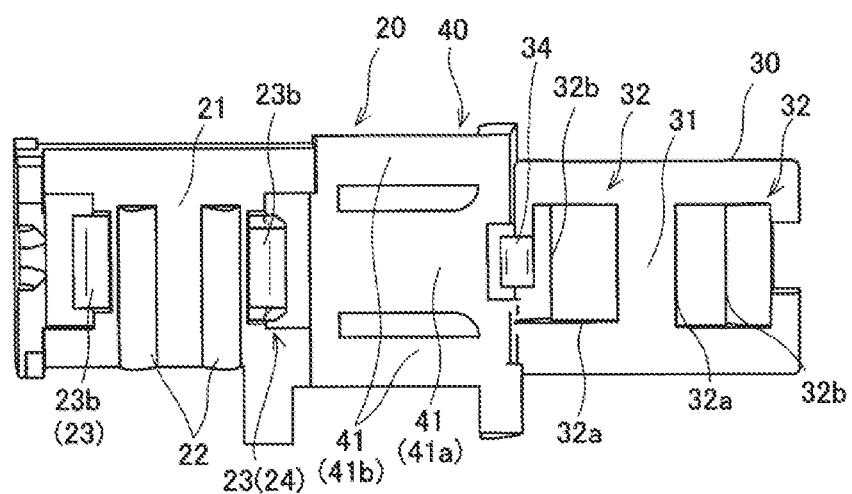
FIG. 5 is a back view of the cable holding portion shown in FIG. 3.

The handle case 10 of the above-described configuration is formed of an integrally molded product integrally formed by molding using a required resin. Hereinafter, a structure of the cable holding portion 20 forming a part of the handle case 10 will be described. Here, FIG. 3 is a front view of the cable holding portion 20 manufactured as an integrally molded product. FIG. 4 is a side view showing the cable holding portion 20 shown in FIG. 3, and FIG. 5 is a rear view showing the cable holding portion 20 shown in FIG. 3.

The cable holding portion 20 is formed of the integrally molded product obtained by integrally molding the cable fixing base 21 and the cap part 30 via the connecting piece 40. The cable fixing base 21 and the cap part 30 are linearly laid out so as to face each other with the connecting piece 40 therebetween. The handle case 10 is shipped to the vehicle manufacturing process as a part of the components configuring the inside door handle device 1.

Figure 6A:
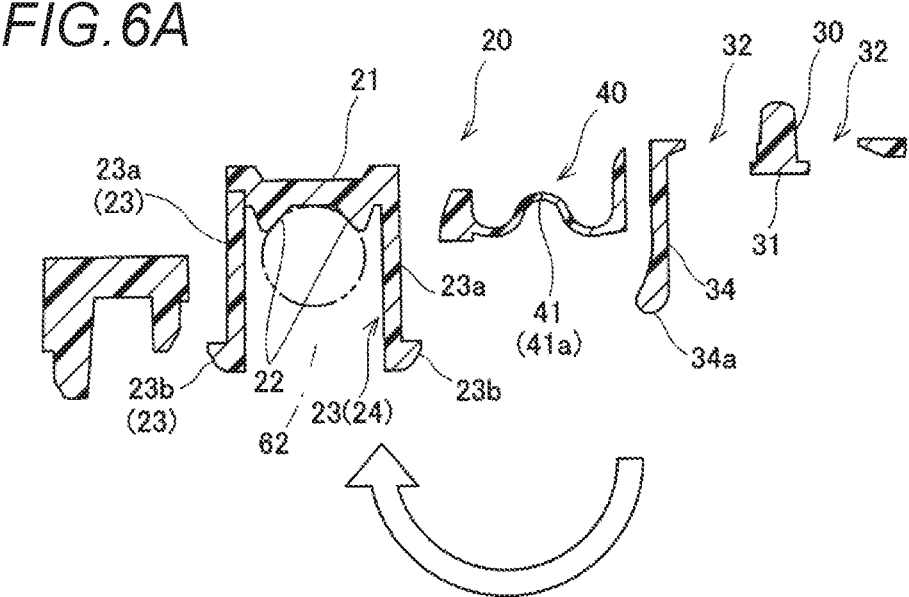
FIGS. 6A and 6B are illustrative diagrams showing a process of fixing a cable device to the cable holding portion.
Figure 6B:
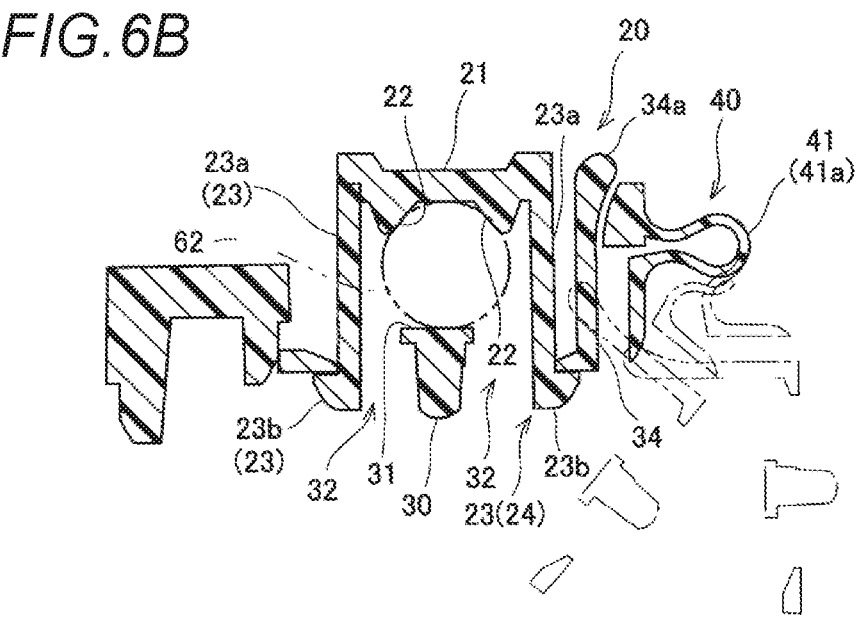

Next, a method of fixing the cable devices 60, 70 to the cable holding portions 20 in the vehicle manufacturing process will be described. Hereinafter, the first cable device 60 will be described as an example, but the same applies to the second cable device 70. FIGS. 6A and 6B are illustrative diagrams showing a process of fixing the cable device 60 to the cable holding portion 20.

First, the end portion of the outer cable 62 of the cable device 60 is arranged onto the cable fixing base 21. At this time, the end portion of the outer cable 62 is arranged onto the cable fixing base 21 so as to be clamped between the pair of protrusions 22.

Next, an external force is applied to the cap part 30 so as to bend the hinge portion 40. By this external force, the hinge portion 40 is bent to approximately 180°, and the cap part 30 is moved from the open position to the fixing position. In the process of the cap part 30 reaching the fixing position, the claw portion 23 serving as the fixed guide piece 24 stands on a front surface of the protruding end 34a of the movable guide piece 34. Therefore, the operator needs to rotate the cap part 30 such that the protruding end 34a of the movable guide piece 34 does not abut against the claw portion 23. Accordingly, the movable range of the movable guide piece 34 is limited, and the rotational position of the cap part 30 from the open position to the fixing position is also guided.

When the rotation of the cap part 30 is continued with the guide, the claw portion 23 of the cable fixing base 21 enters the opening 32a of the claw receiving portion 32 provided on the cap part 30 side. In addition, the clamping portion 31 of the cap part 30 abuts against the outer cable 62. When the cap part 30 is further rotated, the clamping portion 31 presses the outer cable 62 in a radial direction, and the cap part 30 reaches the fixing position. At this time, the engaging claw 23b of the claw portion 23 slips through the opening 32a of the claw receiving portion 32 and is engaged with the engaging portion 32b of the claw receiving portion 32. When the cap part 30 reaches the fixing position, the cap part is held in the posture facing the cable fixing base 21, and the outer cable 62 is clamped between the cap part 30 and the cable fixing base 21. Accordingly, the outer cable 62 is fixed to the cable holding portion 20 of the handle case 10.

As described above, in the present embodiment, the handle case 10 includes the cable fixing bases 21 on which the cable devices 60, 70 are disposed, cap parts 30 that fixes the cable devices 60, 70 to the cable fixing base 21, and the hinge portion 40 provided between the cable fixing base 21 and the cap part 30, and rotating the cap part 30 from the open position at which the cap part 30 is open with respect to the cable fixing base 21, to the fixing position at which the cap part 30 faces the cable fixing base 21 and clamps the cable devices 60, 70 between the cable fixing base 21 and the cap part 30. Here, the cap part 30 includes the movable guide piece 34 erected on the cap part 30, and the cable fixing base 21 includes the fixed guide piece 24 erected on the cable fixing base 21. The fixed guide piece 24 is erected on the front surface of the movable guide piece 34 with the hinge portion 40 therebetween, and restricts the movable range of the protruding end 34a of the movable guide piece 34, thereby guiding the rotational position of the cap part 30 from the open position to the fixing position.

According to the configuration, when the cap part 30 reaches the fixing position, the claw portion 23 serving as the fixed guide piece 24 stands on the front surface of the protruding end 34a of the movable guide piece 34. Therefore, the cap part 30 needs to be rotated such that the protruding end 34a of the movable guide piece 34 does not abut against the claw portion 23. Accordingly, the rotational position of the cap part 30 from the open position to the fixing position is also guided. As a result, it is possible to suppress occurrence of the positional deviation when the cap part 30 is rotated.

Further, when the cap part is rotated, even if a force in directions other than the rotational direction is input to the cap part and a deviation occurs in the rotation position of the cap part 30, the movable range of the movable guide piece 34 is limited by the protruding end 34a of the movable guide piece 34 abutting against the claw portion 23. As a result, a situation in which the rotational position of the cap part 30 is greatly deviated can be suppressed.

In the present embodiment, the hinge portion 40 is formed of the flat plate shaped leaf spring 41.

According to this configuration, it is possible to obtain an advantage that the cable fixing base 21 and the cap part 30 can be integrally molded via the hinge portion 40, while a force other than the rotational direction is likely to be input when the cap part 30 is assembled. However, according to the present embodiment, it is possible to suppress the positional deviation of the cap part 30 during rotation by the movable guide piece 34 and the claw portion 23 (fixed guide piece 24). Accordingly, even in a structure in which the hinge portion 40 formed of the leaf spring 41 is adopted, the positional deviation of the cap part can be suppressed.

In the present embodiment, the fixed guide piece 24 and the movable guide piece 34 are disposed at positions adjacent to each other with the hinge portion 40 therebetween.

When a distance between the fixed guide piece 24 and the movable guide piece 34 is large, it is necessary to increase the sizes of the fixed guide piece 24 and the movable guide piece 34 in the height direction in order to appropriately obtain the guide function of the cap part 30. In this respect, by disposing the fixed guide piece 24 and the movable guide piece 34 close to each other, the size thereof can be reduced in the height direction. Accordingly, the handle case 10 can be reduced in size.

In the present embodiment, the function of the fixed guide piece 24 is realized by the claw portion 23.

According to this configuration, a fixing function and the guide function of the cap part 30 can be realized by a common member. As a result, a plurality of functions can be obtained while simplifying the structure of the handle case 10.

The handle device for vehicle according to the present embodiment has been described above, but the present invention is not limited to the embodiment described above, and various modifications can be made within the scope of the present invention. The handle device applied to the side door has been described in the embodiment described above, but the present invention can be applied to various parts such as a back door as the handle device for vehicle according to the present invention.

The handle device of the vehicle according to the present embodiment is not limited to the inside door handle device, and may be applied to an outside door handle device.

The present application is based on a Japanese Patent Application (JP-A-2017-99501) filed on May 19, 2017, the content of which are incorporated herein by reference.

REFERENCE SIGNS LIST 1 inside door handle device
10 handle case
11 case body
20 cable holding portion
21 cable fixing base
22 protrusion 23 claw portion
23a pillar portion
23b engaging claw
24 fixed guide piece
30 cap part
31 clamping portion
32 claw receiving portion
32a opening
32b engaging portion
34 movable guide piece
34a protruding end
40 hinge portion
41 leaf spring
41a first leaf spring
41b second leaf spring
45 handle
50 lock knob
60, 70 cable device (first cable device, second cable device)
61, 71 inner cable
62, 72 outer cable

The invention claimed is:

1. A vehicle handle device configured to operate a door lock device via a cable device, the vehicle handle device comprising:
an operation member connected to the cable device; and
a handle case housing the operation member,
wherein the handle case comprises:
a cable fixing base in which the cable device is arranged;
a cap part configured to fix the cable device to the cable fixing base, the cap part having a first end and a second end in a longitudinal direction of the cap part; and
a hinge portion provided between the cable fixing base and the cap part, and configured to allow the cap part to rotate from an open position, at which the cap part is open with respect to the cable fixing base, to a fixing position, at which the cap part faces the cable fixing base and clamps the cable device between the cap part and the cable fixing base, the hinge portion being connected to the cap part at the first end,
wherein the cap part includes a movable guide piece erected on the cap part, the movable guide piece being provided closer to the first end than to the second end,
wherein the cable fixing base includes a fixed guide piece erected on the cable fixing base,
wherein the fixed guide piece is located in front of the movable guide piece with the hinge portion therebetween when the cap part is positioned at the open position, and restricts a movable range of the movable guide piece to guide a rotational position of the cap part during a rotation of the cap part from the open position to the fixing position,
wherein the cap part includes an opening extending entirely through the cap part, the opening being positioned on the cap part between the movable guide piece and the second end, and
wherein the fixed guide piece is inserted entirely through the opening when the cap part is positioned at the fixing position.

2. The vehicle handle device according to claim 1, wherein the hinge portion is configured by a leaf spring.

3. The vehicle handle device according to claim 1, wherein the fixed guide piece and the movable guide piece are disposed at positions adjacent to each other with the hinge portion therebetween when the cap part is positioned at the open position.

4. The vehicle handle device according to claim 1, wherein the cable fixing base includes a claw portion engaging with a claw receiving portion provided on the cap part and fixing the cap part at the fixing position, and
wherein the claw portion is the fixed guide piece.

5. The vehicle handle device according to claim 1, wherein the cap part includes a clamping portion configured to clamp the cable device with the cable fixing base when the cap part is positioned at the fixing position, and
wherein the opening is provided on the cap part between the movable guide piece and the clamping portion.

6. The vehicle handle device according to claim 1, wherein the fixed guide piece is one of a plurality of fixed guide pieces on the cable fixing base, and
wherein the opening extending entirely through the cap part is one of a plurality of openings through which the plurality of fixed guide pieces are respectively entirely inserted when the cap part is positioned at the fixing position such that the plurality of fixed guide pieces extend from a first side of the cap part through the cap part to a second, opposite side of the cap part.

7. The vehicle handle device according to claim 5, wherein the fixed guide piece is one of a plurality of fixed guide pieces, and
wherein the opening extending entirely through the cap part is one of a plurality of openings that extend entirely through the cap part, each one of the plurality of openings is positioned directly adjacent to the clamping portion, and each one of the plurality of fixed guide pieces is respectively inserted through a respective one of the plurality of openings when the cap part is positioned at the fixing position.

8. The vehicle handle device according to claim 1, wherein the hinge portion has a first curvilinear shape when the cap part is positioned at the open position, and the hinge portion has a second curvilinear shape when the cap part is positioned at the fixing position.

9. The vehicle handle device according to claim 8, wherein the first curvilinear shape is formed as an approximate S shape.

10. The vehicle handle device according to claim 8, wherein the second curvilinear shape is formed as a loop.

11. The vehicle handle device according to claim 1,
wherein the cable fixing base further includes a pair of claw portions,
wherein one of the pair of the claw portions close to the hinge portion is formed as the fixed guide piece,
wherein the cap part further includes a clamping portion configured to clamp the cable device with the cable fixing base when the cap part is positioned at the fixing position, and
wherein the pair of claw portions faces each other with a predetermined interval therebetween, and the clamping portion is located between the pair of claw portions within the predetermined interval when the cap part is positioned at the fixing position.

* * * * *